US012018823B2

(12) United States Patent
Li

(10) Patent No.: US 12,018,823 B2
(45) Date of Patent: Jun. 25, 2024

(54) FIXING BASE, LAMP FIXING DEVICE AND LAMP

(71) Applicants: OPPLE LIGHTING CO., LTD., Shanghai (CN); SUZHOU OPPLE LIGHTING CO., LTD., Suzhou (CN)

(72) Inventor: Ying Li, Suzhou (CN)

(73) Assignees: OPPLE LIGHTING CO., LTD., Shanghai (CN); SUZHOU OPPLE LIGHTING CO., LTD., Suzhou (CN)

( * ) Notice: Subject to any disclaimer, the term of this patent is extended or adjusted under 35 U.S.C. 154(b) by 266 days.

(21) Appl. No.: 17/565,016

(22) Filed: Dec. 29, 2021

(65) Prior Publication Data
US 2022/0120417 A1    Apr. 21, 2022

Related U.S. Application Data

(63) Continuation of application No. PCT/CN2020/127466, filed on Nov. 9, 2020.

(30) Foreign Application Priority Data

Nov. 20, 2019  (CN) .......................... 201911139608.1
Nov. 20, 2019  (CN) .......................... 201922009534.1

(51) Int. Cl.
*F21V 21/084*   (2006.01)
*F21V 21/088*   (2006.01)
(Continued)

(52) U.S. Cl.
CPC .......... *F21V 21/084* (2013.01); *F21V 21/088* (2013.01); *F21V 23/06* (2013.01); *H02G 3/22* (2013.01)

(58) Field of Classification Search
CPC ...... F21V 21/084; F21V 21/088; F21V 23/06; F21V 17/14; F21V 21/03; H02G 3/22
See application file for complete search history.

(56) References Cited

U.S. PATENT DOCUMENTS 4,929,187 A * 5/1990 Hudson ................... F21V 21/03
                                                    439/537
5,562,343 A * 10/1996 Chan ........................ F21S 8/02
                                                    362/147
(Continued)

FOREIGN PATENT DOCUMENTS

CN    105258082 A    1/2016
CN    106918004 A    7/2017
(Continued)

OTHER PUBLICATIONS

International Search Report of PCT Application No. PCT/CN2020/127466 dated Jan. 27, 2021 with English translation, (6p).

*Primary Examiner* — Kareen K Thomas
(74) *Attorney, Agent, or Firm* — Arch & Lake LLP

(57) ABSTRACT

A fixing base, a lamp fixing device, and a lamp are provided. The fixing base includes a first main body part and a junction box; the first main body part has an accommodation cavity for accommodating the junction box, a first joint part, and a first detachable connection part for direct and detachable connection with the junction box. A first electrical connection part and a second detachable connection part for detachably cooperating with the first detachable connection part are provided on the junction box. The first detachable connection part and the second detachable connection part are configured to be detachably connected through their relative rotation along a rotation shaft, and the junction box can be fixed detachably in the accommodation cavity through the cooperation of the first detachable connection part and the second detachable connection part.

20 Claims, 12 Drawing Sheets

(51) Int. Cl.
*F21V 23/06* (2006.01)
*H02G 3/22* (2006.01)

(56) References Cited

U.S. PATENT DOCUMENTS

| | | | | |
|---|---|---|---|---|
| 6,780,049 B1 * | 8/2004 | D'Angelo | ............. | F04D 29/601 |
| | | | | 439/537 |
| 6,799,982 B2 * | 10/2004 | Kerr, Jr. | ................... | H02G 3/20 |
| | | | | 439/537 |
| 6,997,740 B2 * | 2/2006 | Kerr | ..................... | F04D 29/601 |
| | | | | 439/537 |
| 7,064,269 B2 * | 6/2006 | Smith | ................... | H01R 33/46 |
| | | | | 439/313 |
| 7,105,744 B1 * | 9/2006 | Kwong | .................. | H02G 3/20 |
| | | | | 174/58 |
| 7,297,022 B2 * | 11/2007 | Pearce | ................... | F24F 7/007 |
| | | | | 439/537 |
| 7,976,338 B1 * | 7/2011 | Webster | ................... | H02G 3/20 |
| | | | | 439/537 |
| 9,929,523 B2 * | 3/2018 | Khazeni | ................... | H02G 3/20 |
| 2005/0148241 A1 * | 7/2005 | Kohen | .................... | F21V 23/06 |
| | | | | 439/441 |
| 2006/0193151 A1 * | 8/2006 | Quan | ...................... | F21V 17/02 |
| | | | | 362/640 |
| 2009/0135598 A1 * | 5/2009 | Amos | ..................... | F21S 8/033 |
| | | | | 362/249.01 |

FOREIGN PATENT DOCUMENTS

| | | |
|---|---|---|
| CN | 208295719 U | 12/2018 |
| CN | 209386241 U | 9/2019 |
| CN | 209569599 U | 11/2019 |
| CN | 110762492 A | 2/2020 |
| CN | 210772011 U | 6/2020 |
| JP | 08124415 A | 5/1996 |

\* cited by examiner

FIXING BASE, LAMP FIXING DEVICE AND LAMP

CROSS-REFERENCE TO RELATED APPLICATIONS

The present application is a continuation of PCT patent application No. PCT/CN2020/127466 filed on Nov. 9, 2020 which is based upon and claims the priority of the Chinese patent application No. 201911139608.1 filed on Nov. 20, 2019 and entitled "Fixing Base, Lamp Fixing Device and Lamp", and the priority of the Chinese utility model No. 201922009534.1 filed on Nov. 20, 2019, and entitled "Fixing Base, Lamp Fixing Device and Lamp", the entire contents of which are incorporated herein by reference for all purposes.

TECHNICAL FIELD

The present disclosure relates to the field of lamps, and particularly to a fixing base, a lamp fixing device, and a lamp.

BACKGROUND

Lamps are an indispensable electric appliance in daily life of people. The traditional lamps are usually fixed to foundations through different mounting base trays. Different lamps with different models from different manufacturers have different structures and sizes of mounting base trays, so that it is necessary to perform drilling holes on the foundations and perform mounting and fixation by bolts, expansion screws and the like according to the structures of the mounting base trays, and independent wire connection is needed. When a new lamp needs to be replaced, it is usually necessary to replace the mounting base tray and reconnect wires, so that the mounting way is very complicated.

In order to reduce the maintenance and replacement difficulty of the lamp, the lamps with uniform lamp fixing devices emerge on the market at present. The lamp fixing device of the lamp is generally divided into two parts: one part is fixed on the foundation and may be referred to as the fixing base; and the other part is fixedly connected with a lamp body and may be referred to as a connection base.

After the fixing base is fixed on the foundation, the fixing base may realize mechanical fixation and electric connection with the connection base quickly and simply, thereby greatly simplifying the mounting process of the lamp. Especially when the lamp is replaced, because each lamp body has the same connection base, the lamp body may be replaced directly without disassembling the fixing sea, thereby greatly simplifying the replacing process.

In some circumstances, the fixing base generally includes a main body part and a junction box. The main body part is used for realizing the mechanical fixing and receiving the junction box. The junction box is used for electric connection. Therefore, when the fixing base is mounted, a power supply needs to be connected into the junction box. However, because the main body part has a small internal space and is inconvenient to operate, and a fixed connection or a complicated structural connection way (such as connection with multiple screws) is usually adopted between the main body part and the junction box, the wire connection is very difficult.

SUMMARY

Examples of the present application provides a fixing base, a lamp fixing device, and a lamp, to solve at least one of the above problems.

The examples of the present application employ the following technical schemes.

In one aspect, the present application provides a fixing base, comprising a first main body part and a junction box. The first main body part has an accommodation cavity for accommodating the junction box, a first joint part and a first detachable connection part connected with the junction box directly and detachably; and the junction box is provided with a first electrical connection part and a second detachable connection part cooperated with the first detachable connection part detachably, the first detachable connection part and the second detachable connection part realize a detachable connection by relative rotation along a rotation shaft, and the junction box can be fixed detachably in the accommodation cavity by the cooperation of the first detachable connection part and the second detachable connection part.

In a second aspect, the present application provides a lamp fixing device, comprising a connection base connected with a lamp body and the fixing base. The connection base has a second joint part and a second electrical connection part, the connection base and the first main body part can be mechanically fixed by the cooperation between the first joint part and the second joint part, and at the same time, the first electrical connection part is cooperated with the second electrical connection part, so that the connection base and the junction box are electrically connected by the cooperation between the first electrical connection part and the second electrical connection part.

In a third aspect, the present application provides a lamp, comprising a lamp body and the lamp fixing device, and the lamp body is fixedly connected with the connection base.

BRIEF DESCRIPTION OF THE DRAWINGS

The accompanying drawings described here are used for further understanding of the present application and constitute a part of the present application. Schematic examples of the present application and the description thereof are used to explain the present application, and do not constitute an improper limitation to the present application. In the drawings.

DETAILED DESCRIPTION

To make the objective, technical schemes, and advantages of the examples of the present application clearer, technical schemes of the examples will be described in a clearly and fully understandable way in connection with the drawings related to the examples of the present application. Apparently, the described examples are just a part but not all of the examples of the present application. Based on the described examples herein, one of ordinary skill in the art can obtain other example(s), without any creative labor, which shall be within the scope of the present application.

According to a fixing base, a lamp fixing device and a lamp provided by examples of the present application, a first detachable connection part and a second detachable connection part are provided, so that a first main body part and a junction box are connected detachably by relative rotation along a rotation shaft, thereby greatly simplifying a disassembling and mounting process of the junction box and the first main body part. When a user performs a wire connecting operation, the junction box may be disassembled from the first main body part quickly and simply, and after the wire connecting operation is completed, the junction box can be mounted into the first main body part conveniently. In this way, the wire connecting operation is not limited by the space of the accommodation cavity, thereby solving the problem of the difficult wire connection.

Figure 1:
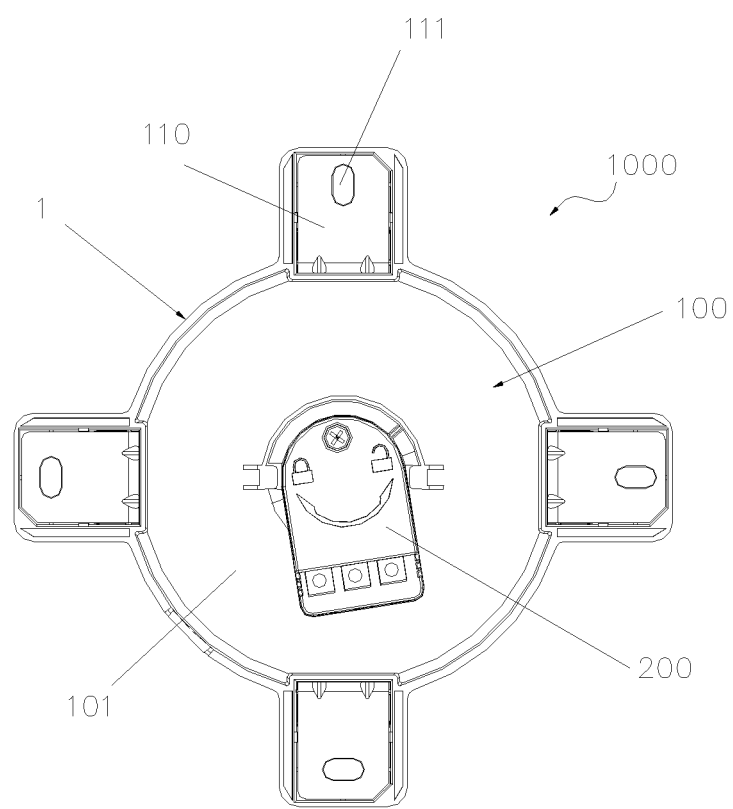
FIG. 1 is a top view of a lamp wire connecting device according to an example of the present application.
Figure 2:
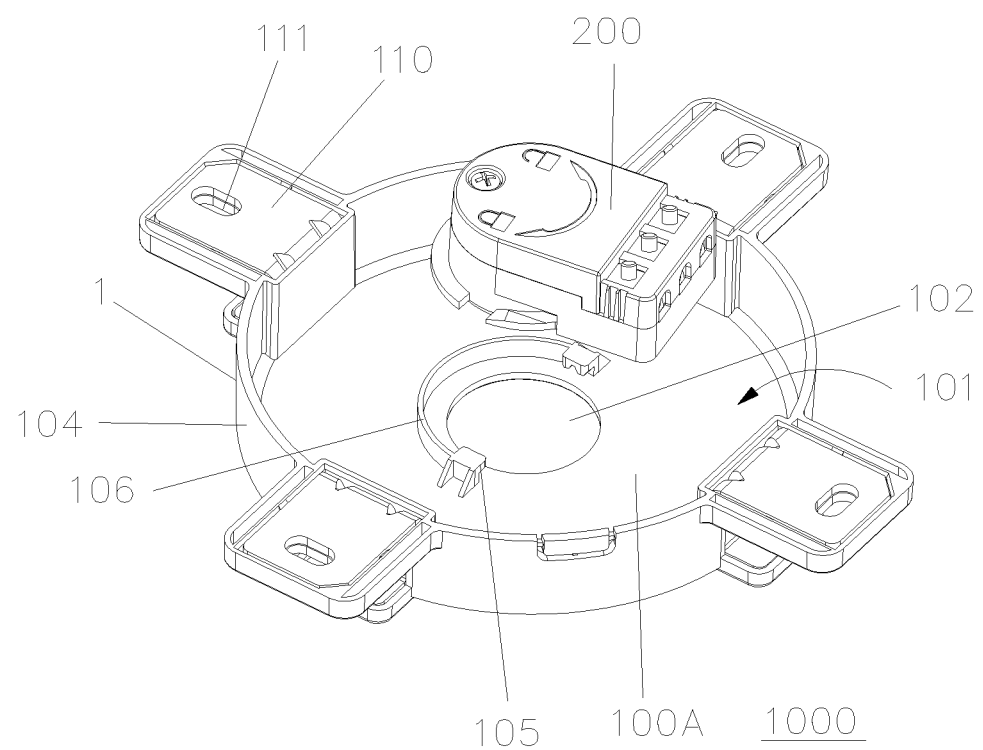
FIG. 2 is a schematically exploded view of FIG. 1.
Figure 7:
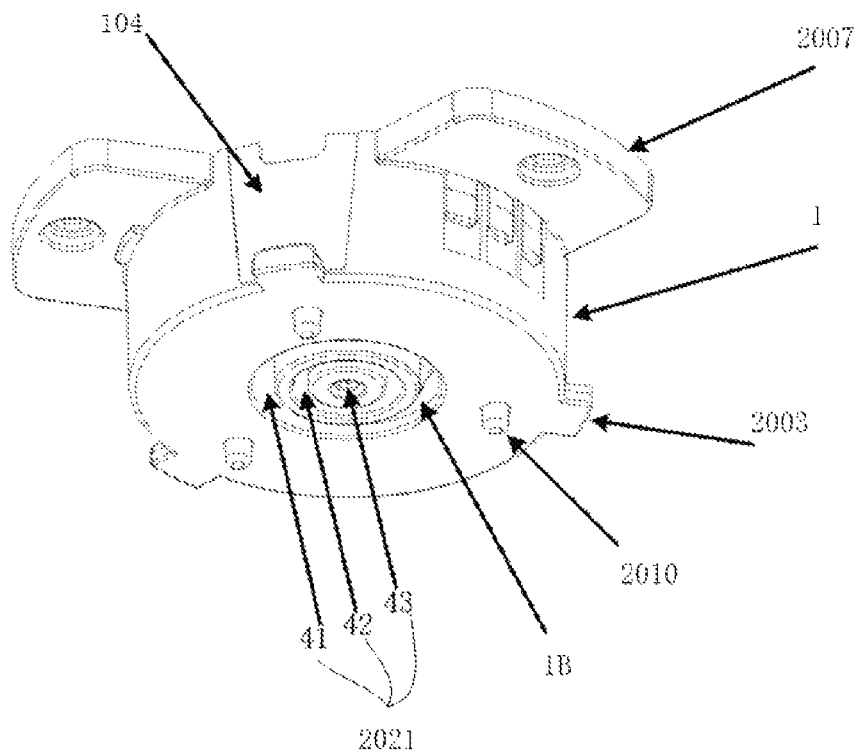
FIG. 7 schematically shows the outside of the stereoscopic diagram of the fixing base in FIG. 1.

FIG. 1 schematically shows a top view of the structure of a fixing base 1000 according to an example of the present application. FIG. 2 is a schematically exploded diagram of FIG. 1. FIG. 7 schematically shows a stereoscopic diagram of a first main body part 1. As shown in FIG. 1, FIG. 2, and FIG. 7, the fixing base 1000 includes a first main body part 1 and a junction box 200 that is mounted in the first main body part 1 detachably.

Specifically, the first main body part 1 includes a bottom end plate 100 and a side wall 104. In an example, the side wall 104 is a vertical side wall that is distributed circumferentially. The bottom end plate 100 and the side wall 104 together to form an accommodation cavity 101, and the surface, which is to form the accommodation cavity 101, of the bottom end plate 100, is a bottom end surface 100A. The whole accommodation cavity 101 is generally in a basin shape. Of course, the bottom end plate 100 may also be in other shapes, as long as the bottom end plate can be combined with the side wall 104 to form the accommodation cavity 101, which is not repeated here. Meanwhile, the first main body part 1 is also provided with a first detachable connection part for directly detachable connection with the junction box, which may be described in detail below.

The junction box 200 has a first electrical connection part 2021. Meanwhile, the junction box 200 is also provided with a second detachable connection part for detachable cooperation with the first detachable connection part; the first detachable connection part and the second detachable connection part are configured to realize detachable connection by relative rotation along a rotation shaft; and moreover, by the detachable connection, the junction box 200 is fixed in the accommodation cavity 101 detachably. In order to reduce an overall thickness of the fixing base 1000, the junction box 200 is generally attached onto the bottom end plate 100, so that the rotation shaft is preferably perpendicular to the bottom end plate 100.

After the junction box 200 in the present example is fixed in the accommodation cavity 101, the first electrical connection part 2021 may face an opening of the accommodation cavity 101, and may also face away from the opening of the accommodation cavity 101; and when the first electrical connection part 2021 faces away from the opening of the accommodation cavity 101, a mounting through hole 102 communicated with the accommodation cavity 101 may be provided on the bottom end plate 100 for exposing the first electrical connection part 2021 outside. In the present example, the first detachable connection part and the second detachable connection part may adopt various different cooperation structures, which is described with examples below.

When the mounting through hole 102 is provided on the bottom end plate 100, a second connection part 202 may be arranged on the junction box 200 and mounted at the mounting through hole 102 in a detachable way; and moreover, and the first electrical connection part 2021 is located outside the accommodation cavity 101 through the mounting through hole 102 (as shown in FIG. 7). Thus, the junction box 200 is mounted in the first main body part 1 in a detachable manner.

Figure 3:
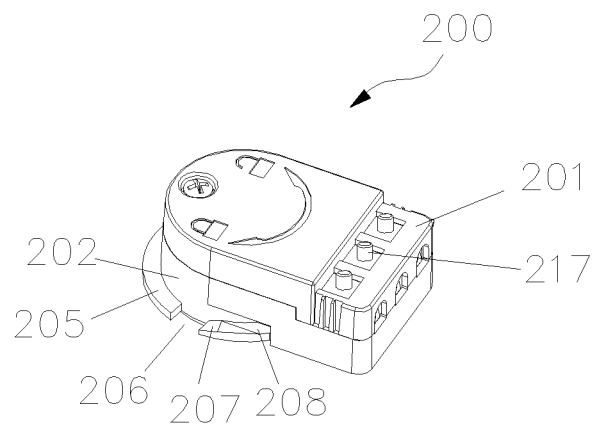
FIG. 3 is a schematic stereoscopic diagram of a junction box.
Figure 8:
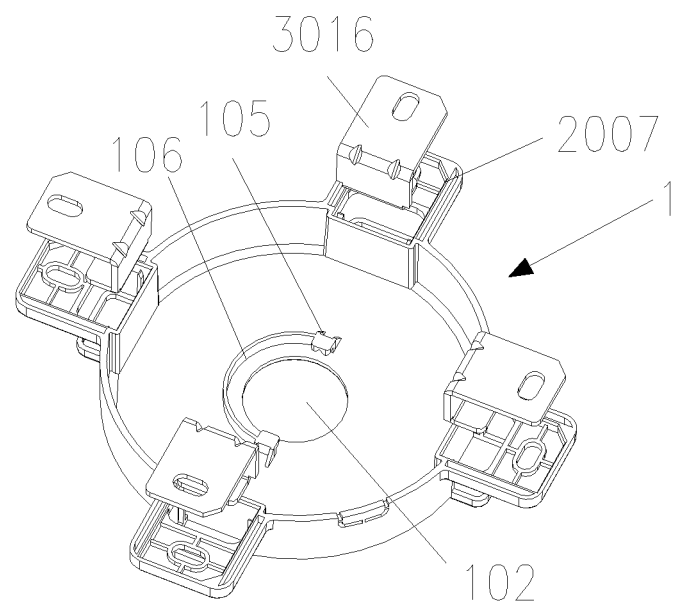
FIG. 8 schematically shows the inside of the stereoscopic diagram of the fixing base in FIG. 1.

As shown in FIG. 2, FIG. 3, and FIG. 8, the mounting through hole 102 is circular, a cross section of the second connection part 202 is circular, and the diameters of the two are matched. In this way, after the junction box 200 is mounted at the mounting through hole 102, the orientation of the junction box 200 may be adjusted rotatably, thereby further facilitating the user to complete the wire connecting operation. It is to be understood that the diameter of the second connection part 202 and the diameter of the mounting through hole 102 may be determined by a tolerance fit principle, so that the second connection part 202 can be mounted in the mounting through hole 102 successfully.

Figure 9:
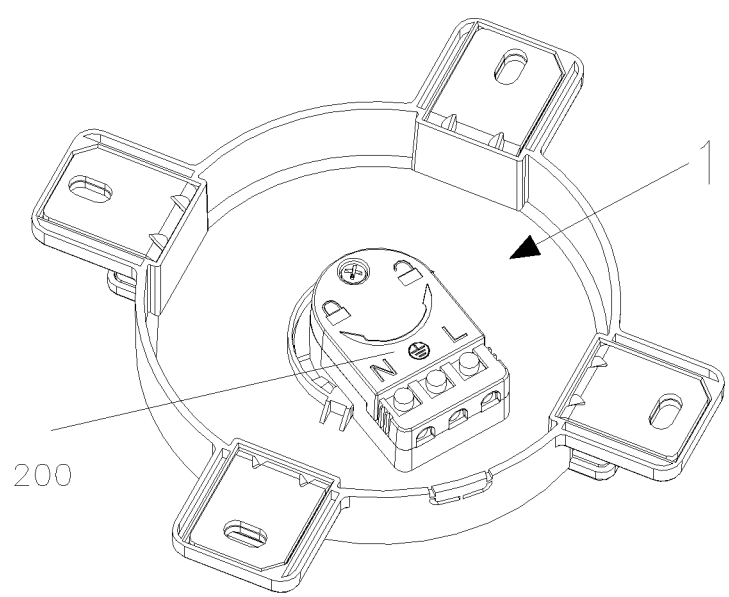
FIG. 9 schematically shows a stereoscopic diagram of an assembled state of the junction box and the fixing base.

Specifically, the second detachable connection part may be an extension part 205 extending outwards in a radial direction on a circumferential outer side of the second connection part 202, and at least two notches 206 are formed on the extension part 205. The first detachable connection part may be designed as a claw 105 arranged around the mounting through hole 102, the claw 105 is matched with the notch 206, and a buckling gap may be formed between the claw 105 and the bottom end surface 100A. The extension part 205 enters the buckling gap via the notch 206, and then the notch 206 and the claw are staggered to each other by the relative rotation along the rotation shaft, so that the extension part 205 may be buckled with the claw 105. In this way, during the assembling, the notch 206 on the extension part 205 is aligned with the claw 105, so that the extension part 205 may be located around the mounting through hole 102, and the second connection part 202 may be aligned with the mounting through hole 102; and then the second connection part 202 (or the junction box 200) is rotated, so that the claw 105 deviates from the notch 206 and is buckled with the extension part 205, as shown in FIG. 9. The rotary buckling assembly way is very simple, which facilitates the user to assemble the first main body part 1 quickly. Preferably, a plurality of claws 105, for example, two claws may be arranged in the circumferential direction, the two claws 105 are opposite to each other in the radial direction, and correspondingly, the two notches 206 may also be opposite to each other in the radial direction, which may simplify the design of the notch 206 and the claw 105.

In an example, as shown in FIG. 3, the extension part 205 includes an oblique leading area 207 and a fastening area 208. The oblique leading area 207 is adjacent to the notch 206, the fastening area 208 is smoothly connected with the oblique leading area 207, and the fastening area 208 can be fixedly connected with the claw 105. In this way, under the lead of the oblique leading area 207, the second connection part 202 can be rotated more smoothly, and the fastening area 208 is buckled with the claw 105, so that the junction box 200 and the first main body part 1 can be assembled together more smoothly.

In an example, an abutting surface may be formed on the junction box 200, such as a side surface, facing the bottom end surface 100A, of the extension part 205. When the oblique leading area 207 is located in the buckling gap, the abutting surface abuts the bottom end surface 100A, and a side of the fastening area 208 facing away from the bottom end surface 100A is flush with a side of the claw 105 facing the bottom end surface 100A or further away from the bottom end surface 100A. In this way, only by rotating the junction box 200, the claw 105 and the fastening area 208 can be buckled tightly, thereby further simplifying the assembling process. More preferably, as shown in FIG. 3, the oblique leading area 207 is only located at a side of the notch 206. In this way, the junction box 200 can be connected with the bottom end plate 100 by rotating the junction box 200 in only one direction, and the junction box 200 can be separated from the bottom end plate 100 by rotating the junction box 200 in an opposite direction, which is a fool-proofing structure in a case where a specific direction of a lead part 201 is required, thereby further facilitating the assembling of the first main body part 1.

Thus, when the user performs the wire connecting operation, the junction box 200 is first disassembled from the mounting through hole 102. After a wire cable is connected onto the junction box 200, the junction box 200 is then mounted into the mounting through hole 102. In this way, the wire connecting operation may not be limited by the accommodation cavity 101 of the first main body part 1, which greatly facilitates the wire connecting operation. In addition, the rest space of the accommodation cavity 101 may also be used as a wire hiding space, so that surplus wires can be hidden in the accommodation cavity 101. In an example, in the radial direction, a ratio of a length of the junction box 200 to a radius of the bottom end plate 100 is less than or equal to 1:2. In this way, the wire connecting operation space is relatively large, so that the user can complete the wire connecting operation conveniently.

Further as shown in FIG. 2, a baffle plate 106 is arranged between the adjacent claws 105, and the extension part 205 of the junction box 200 abuts the baffle plate 106. The baffle plate 106 may prevent the extension part 205 from being separated from the claws 105, thereby improving the assembling stability. In addition, in a case where the specific direction of the lead part 201 is required, the baffle plate 106 may also be used to assist in determining the direction of the lead part 201, which further facilitates the assembling of the first main body part 1. In a preferred example, the baffle plate 106 is arc and extends along the circumferential direction of the mounting through hole 102.

Figure 4:
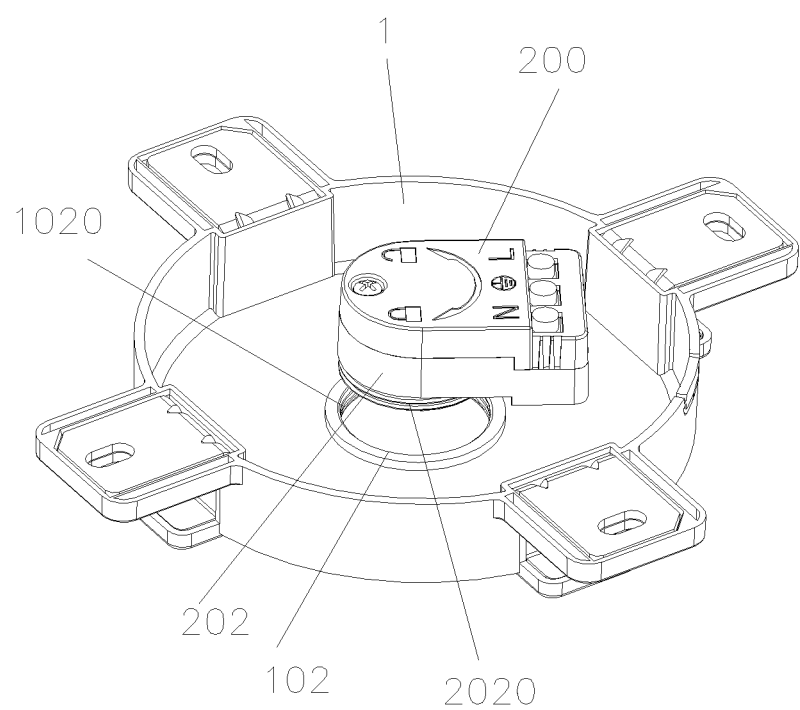
FIG. 4 schematically shows another assembling way of the junction box and a fixing base.

FIG. 4 schematically shows another assembling way of the junction box 200 and the first main body part 1. As shown in FIG. 4, internal threads 1020 are formed on the mounting through hole 102, and external threads 2020 matched with the internal threads 1021 are formed on a circumferential outer wall of the second connection part 202. Thus, the second connection part 202 and the mounting through hole 102 are threadedly connected, that is, the junction box 200 and the first main body part 1 are threadedly connected, and the orientation of the junction box 200 is adjusted rotatably.

In the present example, the axis of the mounting through hole 102 and the rotation shaft of the junction box 200 may be arranged coaxially, so that the junction box 200 may not be eccentrically displaced relative to the mounting through hole 102 when rotating, and can be kept on its own position.

For a scheme that no mounting through hole 102 is provided on the bottom end plate 100, the above matching structure of the claw 105 and extension part 205 or the matching structure of the internal threads 1020 and external threads 202 may still be adopted, and these structures do not need to be arranged around the mounting through hole 102; and moreover, in this scheme, the position of the first electrical connection part 2021 is usually opposite to that in the above scheme, that is, the first electrical connection part 2021 is located at the side of the junction box 200 facing away from the bottom end surface 100A.

Further as shown in FIG. 3, the junction box 200 further includes a lead part 201, and the lead part 201 is located in the accommodation cavity 101 of the first main body part 1. The lead part 201 is connected with the wire cable. The second connection part 202 is mounted at the mounting through hole 102 detachably, and is preferably buckled up after rotation, and may also be separated after rotation in an opposite direction. Because the first electrical connection part 2021 and the second connection part 202 form an integrated structure, during the assembling, as long as the second connection part 202 is mounted in place, it can be ensured that the first electrical connection part 2021 is located outside the bottom end plate 100 through the mounting through hole 102. It is unnecessary to pay special attention to the assembled state of the first electrical connection part 2021, so that the assembling process of the first main body part 1 is facilitated.

Figure 5:
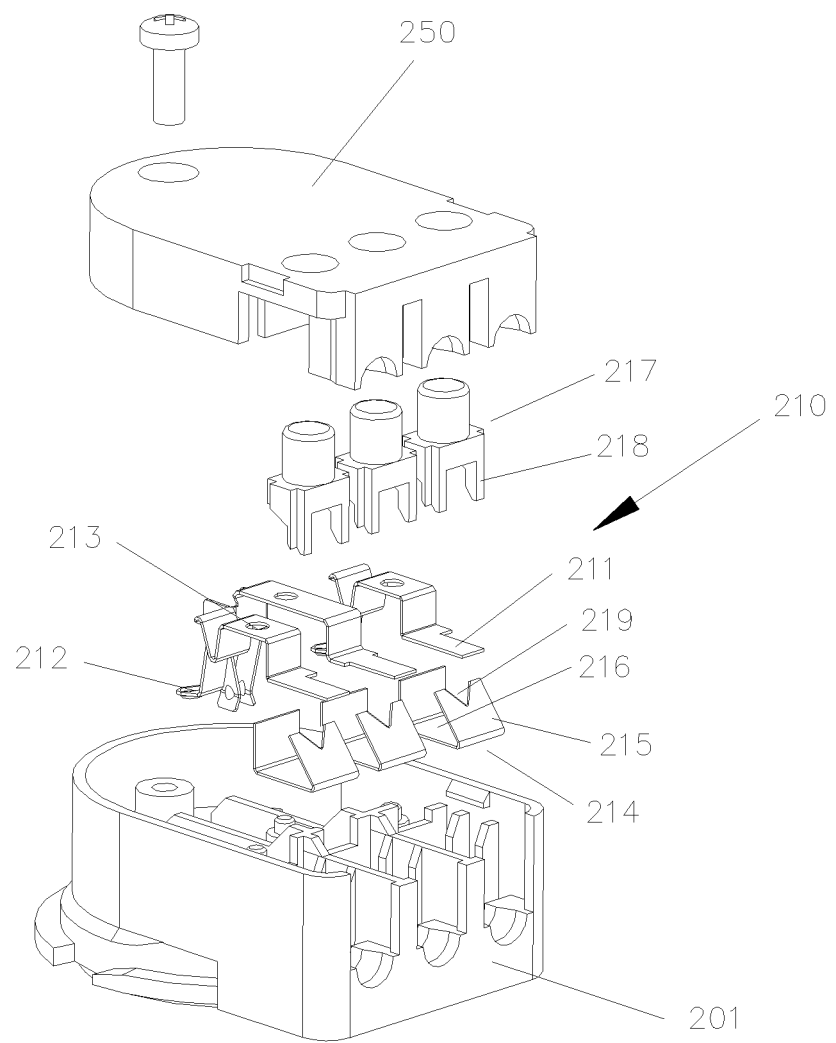
FIG. 5 is a schematically stereoscopic exploded diagram of the junction box.
Figure 6:
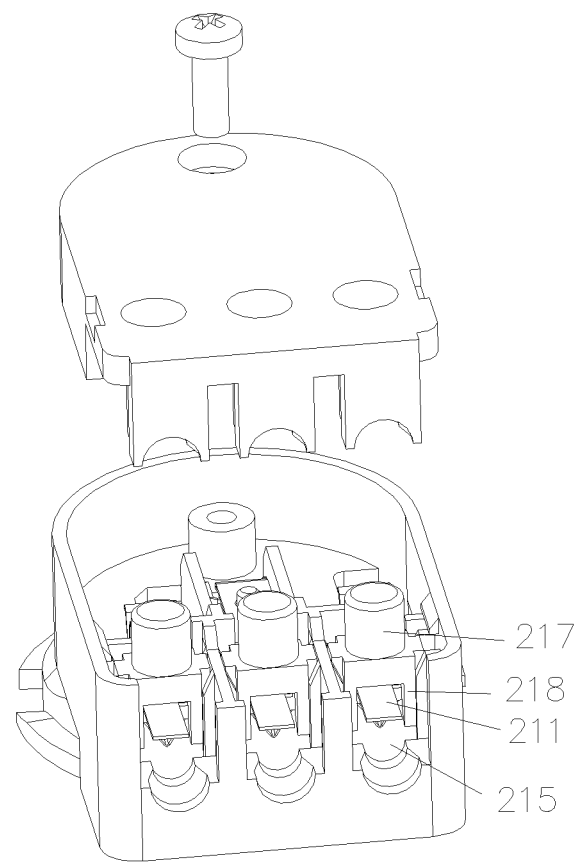
FIG. 6 is a schematically stereoscopic exploded diagram of the junction box from another viewing angle.

FIG. 5 and FIG. 6 show an internal structure of the junction box 200. As shown in FIG. 5 and FIG. 6, the junction box 200 includes a box cover 250 and a wire connecting module 210 fastened with the box cover and arranged in the box cover 250. The wire connecting module 210 includes a wire connecting terminal 211 and an electrode 212 electrically connected with the wire connecting terminal 211. The wire connecting terminal 211 is located in the lead part 201, and the electrode 212 forms an electric connection component of the first electrical connection part 2021. In a use state of the first main body part 1, an external wire cable is electrically connected with the wire connecting terminal 211 (for example, by at least two wire cables including a live wire and a zero wire; and in other preferred examples, there may be three wires including a live wire, a ground wire, and a zero wire); and moreover, the lamp is powered through the wire connecting terminal 211 and the first electrical connection part 2021. Because the wire connecting module 210 is a complete circuit module, during the wire connecting operation, only the wire cable and the wire connecting terminal 211 need to be electrically connected together, thereby simplifying the wire connecting operation. In a specific example, the wire connecting module 210 has three wire connecting terminals 211 in total and corresponding three electrodes 212. The three wire connecting terminals 211 may be connected with the corresponding three wires, respectively. For example, the three wires are the live wire, the ground wire, and the zero wire, the three wire connecting terminals 211 are a positive terminal, a negative terminal, and a ground terminal, and the three electrodes 212 are correspondingly a positive electrode, a negative electrode, and a grounding electrode. In other examples, two wire connecting terminals 211 are provided, and correspondingly, two electrodes 212 are provided. The two wire connecting terminals 211 may be connected with the corresponding two wires, respectively. For example, the two wires are the live wire and the zero wire, the two wire connecting terminals 211 are the positive terminal and the negative terminal, and the two electrodes 212 are correspondingly the positive electrode and negative electrode.

Specifically, as shown in FIG. 5, the wire connecting module 210 includes a metal elastic sheet 213, a first end of the metal elastic sheet is located in the lead part 201 to form the wire connecting terminal 211, and the second end forms the electrode 212 serving as the electric connection component of the first electrical connection part 2021. The wire connecting module 210 also includes an elastic clamping sheet 214 located below the metal elastic sheet 213. The elastic clamping sheet 214 includes a flat part 216 mounted on the bottom surface of the junction box 200 and a bending part 215 opposite to the flat part 216 and bent towards the metal elastic sheet 213. Thus, the bending part 215 elastically contacts the first end of the metal elastic sheet 213. The wire connecting module 210 also includes a button 217 located above the metal elastic sheet 213 and extending out of the top surface of the junction box 200. A presser foot 218 of the button 217 is located in the junction box 200 and over-strides the first end of the metal elastic sheet 213 to press the bending part 215 of the elastic clamping sheet 214. According to the structure, when the wire connecting operation is performed, the button 217 is pressed first, so that the bending part 215 is pressed to be separated from the first end of the metal elastic sheet 213, and the wire cable is inserted between the bending part 215 and the metal elastic sheet 213; and then the button 217 is released, so that the bending part 215 is rebounded and clamps the wire cable together with the metal elastic sheet 213. In this way, the electric connection between the wire cable and the wire connecting module 210 is realized conveniently without other auxiliary tools, thereby simplifying the wire connecting operation.

The bending part 215 is also bent in a direction away from the lead part 201, and a clamping notch 219 is formed on the bending part 215. A vertex of the clamping notch 219 faces the lead part 201, and an opening of the clamping notch faces away from the lead part 201. In this way, after the electric connection between the wire cable and the wire connecting module 210 is completed, the wire cable may be seized by the clamping notch 219 and is difficult to separate from the wire connecting module 210, thereby improving the stability of the electric connection between the wire cable and the metal elastic sheet 213.

The metal elastic sheet 213 is constructed as that a width of the first end of the metal elastic sheet is smaller than the width of the bending part 215 of the elastic clamping sheet 214. The button 217 has two presser feet 218. The two presser feet 218 stride over the first end of the metal elastic sheet 213 and press the bending part 215 of the elastic clamping sheet 214. According to the structure, the bending part 215 can be pushed more stably by pressing the button 217, and the wire cable may be inserted between the two presser feet 218, so that the electric connection between the wire cable and the metal elastic sheet 213 is completed successfully.

Further as shown in FIG. 7, the first electrical connection part 2021 may be a gyration structure with a gyration shaft as a gyration center. A corresponding amount of electric connection ends corresponding to the wire connecting terminals 211 and the electrodes 212 are provided inside the first electrical connection part 2021, and the electric connection ends are coaxially arranged from inside to outside along the gyration shaft. In the present example, the electric connecting end may be designed as a receiving groove with electric connecting capacity, referring to FIG. 7, the receiving groove includes a first receiving groove 41, a second receiving groove 42, and a third receiving groove 43. Specifically, an inward-recessed first receiving cavity 1B is provided on the edge of the second connection part 202 of the junction box 200. An inner wall of the first receiving cavity 1B forms a cylindrical first insulation part with a certain height, a cylindrical second insulation part with the same height as the first insulation part arranged in the first insulation part and parallel to the first insulation part, and a cylindrical third insulation part with the same height as the second insulation part arranged in the second insulation part and parallel to the second insulation part; the annular first receiving groove 41 is formed between the first insulation part and the second insulation part; the annular second receiving groove 42 is formed between the second insulation part and the third insulation part; and the circular third receiving groove 43 is arranged in the center of the third insulation part.

Further, as shown in FIG. 5, in a preferred example of the present disclosure, three electrodes 212 of the wire connecting module 210 of the junction box 200 are provided, i.e., a positive electrode, a negative electrode, and a grounding electrode, as described above. The three electrodes are formed by bending the metal elastic sheet 213. The three electrodes 212 extend into the first receiving groove 41, the second receiving groove 42, and the third receiving groove 43, respectively.

Figure 10:
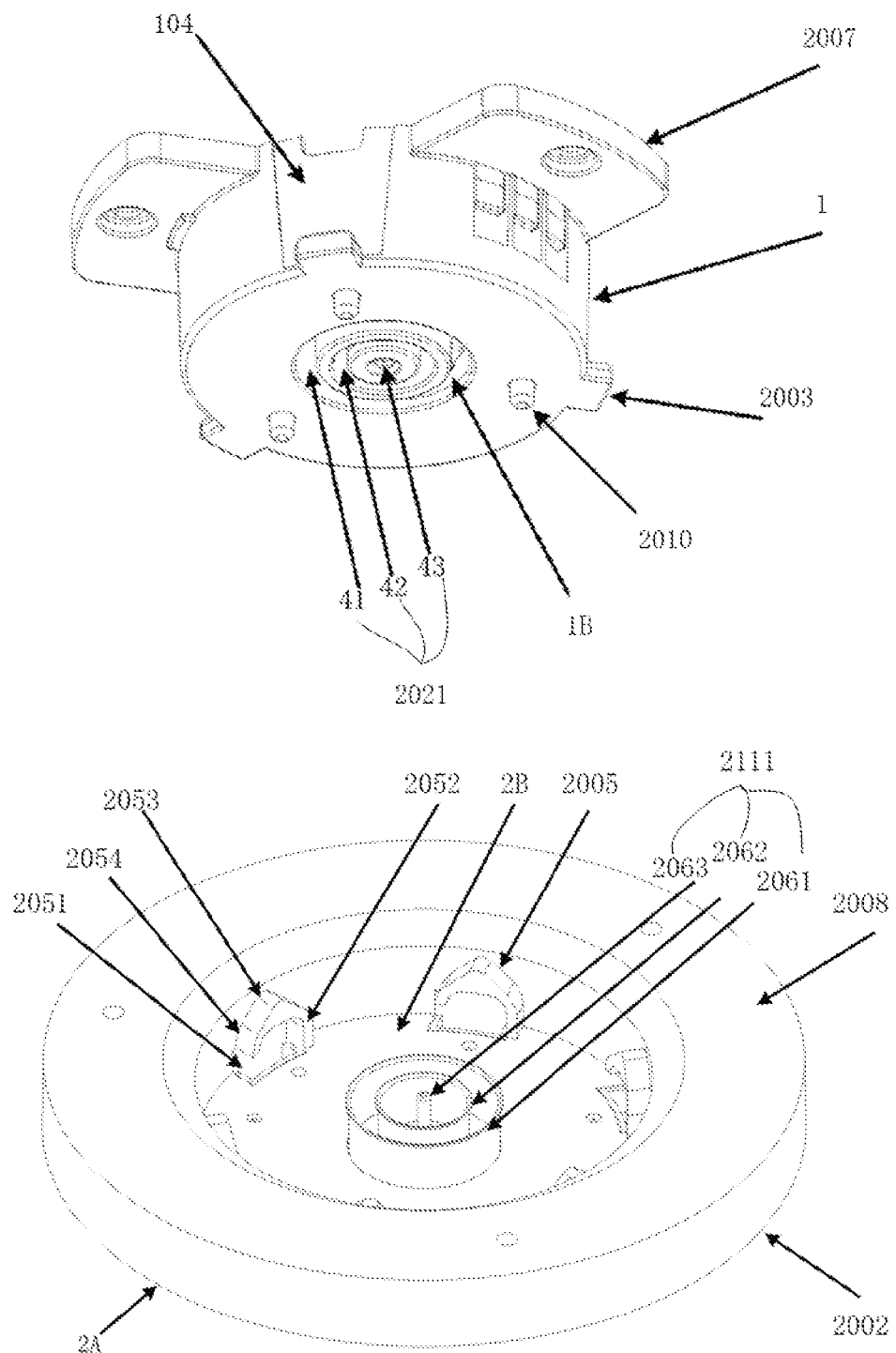
FIG. 10 schematically shows a lamp mounting device according to an example of the present application.
Figure 11:
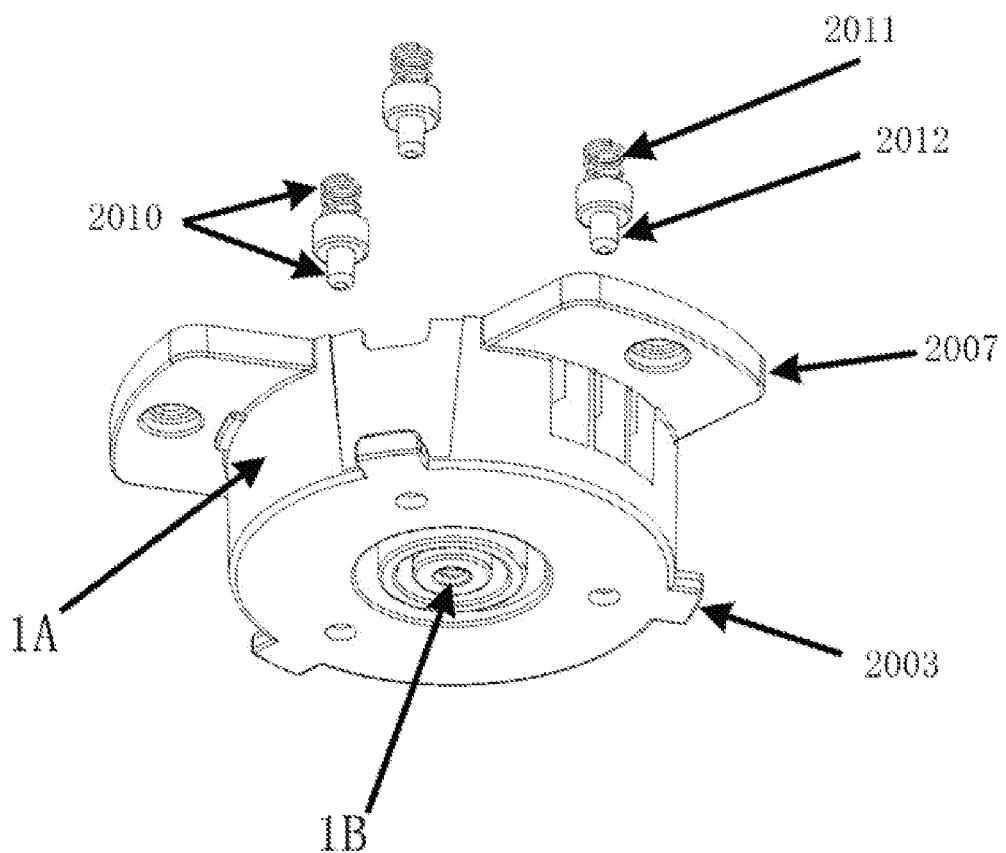
FIG. 11 schematically shows an exploded diagram of the fixing base.
Figure 12:
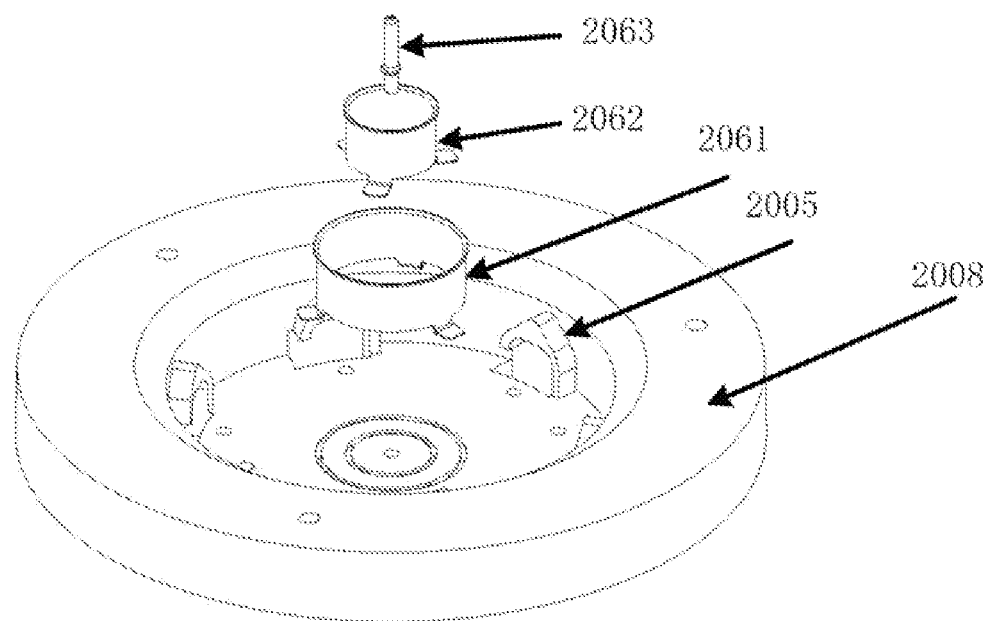
FIG. 12 schematically shows an exploded diagram of a connection base.

FIG. 10, FIG. 11 and FIG. 12 schematically show a lamp mounting device 2000 according to an example of the present disclosure. As shown in FIG. 10, FIG. 11 and FIG. 12, the lamp fixing device 2000 includes a fixing base 1000 and a connection base 2002 that are paired for use. A main body structure of a first main body part 1 is as described above and is mounted onto basal bodies, such as a ceiling, or a building wall, in advance. The connection base 2002 is matched with the first main body part 1.

The structure of the fixing base 1000 in the present example is the same as that in the above example and is not repeated here. The connection base 2002 in the present example has a second main body part 2A. The second main body part 2A of the connection base 2002 is provided with a second receiving cavity 2B for receiving the first main body part 1. The inner wall of the second receiving cavity 2B is provided with a second joint part. A second electrical connection part 2111 is arranged at the central position of the second receiving cavity 2B.

When the lamp needs to be mounted onto the basal body, such as the ceiling, or the building wall, an operator only needs to push up the connection base 2002, so that the second receiving cavity 2B of the second main body part 2A of the connection base 2002 receives the first main body part 1, then only by rotating the connection base 2002 in the axial direction, the mechanical connection between the first joint part of the first main body part 1 and the second joint part of the connection base 2002 and the electrical connection between the first electrical connection part 2021 and the second electrical connection part 2111 of the connection base 2002 can be realized simultaneously, thereby realizing the mechanical connection and electrical connection of the lamp. The term "axial direction" used in the preferred example of the present disclosure refers to an axis direction of the rotation shaft. The term "push up" used in the preferred example of the present disclosure refers to that the connection base 2002 is pushed towards a direction approaching the first main body part 1 along the axial direction or the connection base 2002 is axially pushed towards a direction where a distance between the connection base 2002 and the first main body part 1 is decreased.

When the lamp is disassembled, the operator only needs to push up the connection base 2002 and then rotate the connection base 2002 in an opposite direction so as to separate the connection base 2002 from the first main body part 1, so that the mechanical connection between the first joint part of the first main body part 1 and the second joint part of the connection base 2002 and the electrical connection between the first electrical connection part 2021 of the first main body part 1 and the second electrical connection part 2111 of the connection base 2002 are disconnected, thereby disassembling the lamp. By the lamp fixing device of the preferred example of the present disclosure, the operator can mount and disassemble the lamp quickly, so that the use is simple, and the maintenance is convenient.

In an example, the lamp fixing device 2000 also has an elastic element 2010. The elastic element 2010 is configured to apply an axial acting force and a radial frictional force between the first main body part 1 and the connection base 2002, so as to avoid the relative movement between the assembled connection base 2002 and first main body part 1, that is, it is ensured that the connection base 2002 cannot move up and down and left and right relative to the first main body part 1 after the lamp is mounted. Further, as shown in FIG. 10, the elastic element 2010 may be arranged on a position, near the first joint part, on the bottom end surface of the first main body part 1 of the fixing base 1000, and used to apply the axial acting force to the bottom end surface of the second receiving cavity when the first joint part of the fixing base 1000 and the second joint part of the connection base 2002 are connected. Further, the elastic element 2010 may also be arranged on a position (not shown), near the second joint part, on the bottom end surface of the second receiving cavity of the connection base 2002, and used to apply the axial acting force and the radial acting force to the bottom end surface of the first main body part of the fixing base 1000 when the first joint part of the fixing base 1000 and the second joint part of the connection base 2002 are connected. Further, the elastic element 2010 may also be arranged on the bottom end surface of the first main body part of the fixing base and on the bottom end surface (not shown) of the second receiving cavity of the connection base. Further, the elastic element 2010 is a spring, or other structures, such as a metal elastic sheet. Preferably, as shown in FIG. 11, the elastic element 2010 arranged on the bottom end surface of the first main body part of the fixing base includes an elastic part 2011 and a pressing part 2012. The pressing part 2012 is fixedly connected with the elastic part 2011. When the first main body part 1 and the connection base 2002 are connected, the elastic part 2011 is squeezed by the junction box 200, so that the pressing part 2012 of the elastic element 2010 squeezes downward the bottom end surface of the cavity of the connection base 2002, at this time, the elastic part 2011 is in a pressed state and generates an axial acting force between the first main body part 1 and the connection base 2002, thereby ensuring that the connection base 2002 cannot move up and down and left and right relative to the first main body part 1 after the lamp is mounted. Further, the elastic elements 2010 are arranged uniformly on positions near the first joint part and around the center of the bottom end surface 100A of the first main body part 1, or the elastic elements 2010 are arranged uniformly on positions near the second joint part and around the center of the bottom end surface of the second receiving cavity 2B of the connection base 2002. Further, the amount of the elastic elements 2010 is the same as that of the first joint parts or the second joint parts; and moreover, the elastic elements 2010 and the first joint parts and second joint parts all are distributed linearly along a radial direction. Preferably, three elastic elements 2010 are provided.

In an example, the first joint parts of the first main body part 1 are at least two bumps 2003 arranged along the circumferential direction of the first main body part 1. Correspondingly, the second joint parts of the connection base 2002 are at least two U-shaped mounting grooves 2005 arranged along the circumferential direction of the inner wall of the second receiving cavity 2B. The U-shaped mounting groove 2005 includes an opening end 2051 and a limitation structure 2052. When the first main body part 1 is combined with the connection base 2002, the bump 2003 of the first main body part 1 is installed from the opening end 2051 of the U-shaped mounting groove 2005 and rotates along the circumferential direction of the inner wall of the second receiving cavity 2B, and the bump is installed in place until it is rotated to the limitation structure 2052 of the U-shaped mounting groove 2005, that is, the mechanical connection between the first joint part of the first main body part 1 and the second joint part of the connection base 2002 is completed.

In an example, as shown in FIG. 10, the limitation structure 2052 and opening end 2051 of the U-shaped mounting groove 2005 have a height difference, and the limitation structure 2052 is higher than the opening end 2051. When the lamp is mounted, the connection base 2002 is pushed up to overcome the axial acting force of the elastic element 2010 on the connection base 2002, the bump 2003 of the connection base 2002 is pushed to a position nearby the opening end 2051 of the U-shaped mounting groove 2005, and then the bump 2003 enters from the opening end 2051 of the U-shaped mounting groove 2005 and rotates along the circumferential direction of the inner wall of the second receiving cavity 2B to abut against the inner side wall of the limitation structure 2052. Due to the axial acting force of the elastic element 2010, the connection base 2002 moves axially away from the first main body part 1 until the top surface of the bump 2003 of the first main body part 1 is attached to the inner top surface of the limitation structure 2052 of the connection base 2002, thereby realizing the mechanical connection between the first joint part of the first main body part 1 and the second joint part of the connection base 2002. Because there is always the axial acting force generated by the elastic elements 2010 between the first main body part 1 and the connection base 2002, the first main body part 1 and the connection base 2002 are buckled to each other more firmly under the action of the gravity of the lamp, so that the shaking of the lamp may be avoided.

In an example, the amount of the second joint parts is in a multiple relationship with the amount of the first joint parts, and the amount of the second joint parts is not less than that of the first joint parts. Specifically, three first joint parts, such as bumps 2003, are preferably provided, and six second joint parts, such as U-shaped mounting grooves 2005 are provided; the three bumps 2003 are spaced apart from each other at a same angle; the six U-shaped mounting grooves 2005 are spaced apart from each other at a same angle; and by the configuration, the mechanical connection between the first joint parts of the first main body part 1 and the second joint parts of the connection base 2002 can be realized only by a small-angle rotation, so that it is more convenient and fast to mount and disassemble the lamp.

In an example, the U-shaped mounting groove 2005 also has a triangular guiding part 2053 which is used to play a guiding role when the bump 2003 of the first main body part 1 is connected with the U-shaped mounting groove 2005 of the connection base 2002. Specifically, the top end of the guiding part 2053 faces the bottom end surface of the first main body part 1, two sides of the guiding part 2053 are small oblique planes, and under the guiding effect of the small oblique planes, the operator can place the bump 2003 quickly and correctly at the opening end 2051 of the U-shaped mounting groove 2005, so that it is unnecessary to clearly observe the relative position of the bump 2003 and U-shaped mounting groove 2005 before the aligning mounting, and the blind mounting of the lamp can be realized only by hand feeling.

In an example, the U-shaped mounting groove 2005 also has a hooking part 2054. The hooking part 2054 is a small oblique plane adjacent to the opening end 2051 of the U-shaped mounting groove 2005 and extending towards the bottom end surface of the second receiving cavity 2B. With the hooking part 2054, the operator needs to push up and then rotate the connection base 2002 before disassembling the lamp. Specifically, when the first main body part 1 and the connection base 2002 need to be separated, due to the hooking part 2054, the operator cannot separate the first main body part 1 from the connection base 2002 by rotating the connection base 2002 directly in an opposite direction, because the hooking part 2054 will prevent the bump 2003 from moving out of the U-shaped mounting groove 2005 directly. At the moment, the operator needs to push up the connection base 2002 first, because positions of the first main body part 1 and the bump 2003 are fixed, the upward movement of the connection base 2002 leads to the separation of the top surface of the bump 2003 from the inner top surface of the limitation structure 2052 of the U-shaped mounting groove 2005 which are attached to each other originally, and correspondingly, the opening end 2051 of the U-shaped mounting groove 2005 moves to a position with the same height as that of the bump 2003, and then the connection base 2002 is rotated in an opposite direction, so that the disassembling of the lamp can be realized. This configuration that the lamp can be disassembled only by first pushing up and then rotating the connection base 2002 decreases the possibility that the lamp is disassembled by fault operation, decreases the possibility of danger caused by disassembling the lamp by the children without permission, and improves the connection stability between the first main body part 1 and the connection base 2002 and the power utilization safety of the lamp.

In the present example, the second electrical connection part 2111 of the connection base 2002 includes conductive terminals with the same amount as that of the receiving grooves on the first electrical connection part 2021 from inside to outside along the gyration shaft, and the positions of conductive terminals correspond to those of the receiving grooves one by one. When the first electrical connection part 2021 is cooperated with the second electrical connection part 2111, the conductive terminals can stretch into the corresponding receiving grooves to realize the electrical connection. Preferably, as shown in FIG. 10 and FIG. 12, the second electrical connection part 2111 of the connection base 2002 includes a first conductive terminal 2061, a second conductive terminal 2062 and a third conductive terminal 2063 which are distributed in sequence from outside to inside. When the first joint part of the first main body part 1 is connected with the second joint part of the connection base 2002, the first conductive terminal 2061, the second conductive terminal 2062, and the third conductive terminal 2063 are received in the first receiving groove 41, the second receiving groove 42, and the third receiving groove 43, respectively, and electrically connected with the electrodes in the receiving grooves, so that the electrical connection between the first electrical connection part 2021 of the junction box 200 and the second electrical connection part 2111 of the connection base 2002 is realized. Further, the first conductive terminal 2061 and the second conductive terminal 2062 are metal rings respectively matched with the first receiving groove 41 and the second receiving groove 42 in size and shape. The third conductive terminal 2063 is a metal pin matched with the third receiving groove 43 in size and shape. By the annular electrical connection, contact areas between the first receiving groove 41, the second receiving groove 42, and the third receiving groove 43, and the first conductive terminal 2061, the second conductive terminal 2062, and the third conductive terminal 2063 are increased, so that the first electrical connection part 2021 and the second electrical connection part 2111 can realize the electrical connection in any relative rotating and positioning direction. At the same time, because the first insulation part, the second insulation part, and the third insulation part completely isolate the first conductive terminal 2061, the second conductive terminal 2062, and the third conductive terminal 2063, the power utilization safety is improved.

In an example, as shown in FIG. 10, the first main body part 1 is formed with a mounting support seat 2007 protruding outward from the upper end edge of the first main body part, and the first main body part 1 is connected with the basal body, such as the ceiling, through the mounting support seat 2007. Specifically, a plurality of screw holes are provided on the mounting support seat 2007 and are used for screwing connection with the ceiling or the building wall.

In an example, as shown in FIG. 12, the second main body part 2A of the connection base 2002 is formed with an annular bearing part 2008 protruding outward from its upper end edge, and the lamp is connected with the connection base 2002 by the annular bearing part 2008.

Figure 17:
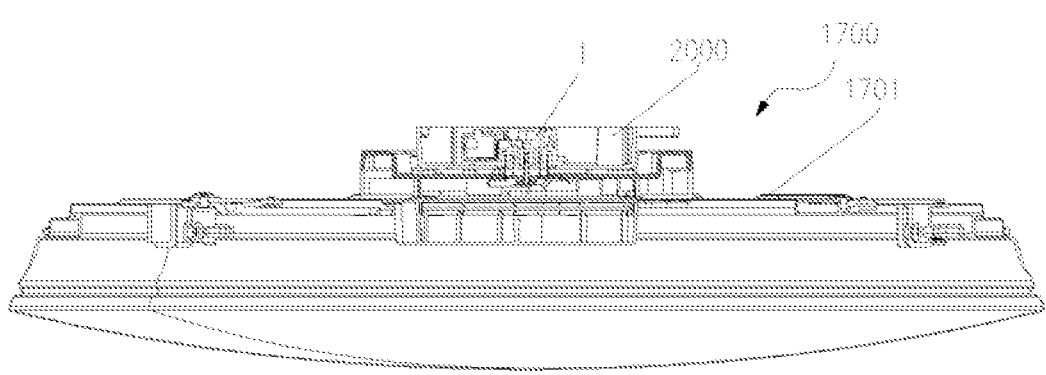
FIG. 17 schematically shows a lamp according to an example of the present application.

As shown in FIG. 17, in a lamp 1700 including the lamp fixing device 2000 provided by the example, the fixing base 1000 is an independent component. The connection base 2002 may be connected with a lamp body 1701 detachably, and may also be integrated with the lamp body 1701; and moreover, the second joint part in the connection base 2002 may be integrated onto the second main body part 2A, and when the connection base 2002 is integrated with the lamp body 1701, the second electrical connection part 2111 may also be arranged independently. For example, the second joint part and the second electrical connection part 2111 may be arranged directly and independently at different parts of the lamp body 1701 without the second main body part 2A.

The present disclosure is further described below by a specific mounting example.

Firstly, electric wires that are pre-arranged in the ceiling or the wall are peeled respectively, and a peeling length is preferably 8-10 mm; and then switch buttons corresponding to various electrodes on the first main body part 1 are pressed, and the corresponding electric wires are inserted respectively and screwed with the ceiling or wall through a plurality of screw holes on the mounting support seat 2007, so that the first main body part 1 can be fixed on the ceiling or the building wall.

Next, the connection base 2002 is aligned with the center of the first main body part 1, and the connection base 2002 is pushed up, so that the first conductive terminal 2061, the second conductive terminal 2062, and the third conductive terminal 2063 are received in the first receiving groove 41, the second receiving groove 42, and the third receiving groove 43, respectively.

Finally, the connection base 2002 is rotated, so that the bump 2003 of the first main body part 1 is installed from the opening end 2051 of the U-shaped mounting groove 2005 and rotated along the circumferential direction of the inner wall of the second receiving cavity 2B, and the bump is installed in place until it is rotated to the limitation structure 2052 of the U-shaped mounting groove 2005.

Because the bump 2003 is buckled into the U-shaped mounting groove 2005, the connection between the first main body part 1 and the connection base 2002 is firmer and more stable under the axial acting force of the elastic element 2010 and the gravity of the lamp, thereby the mechanical connection of the lamp is realized.

Figure 13:
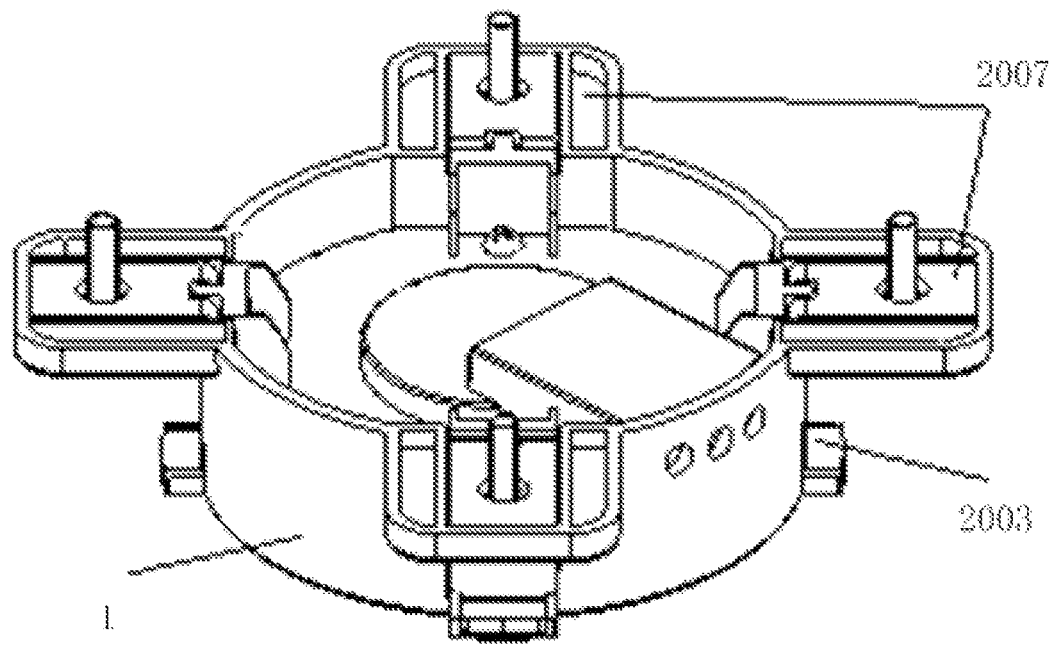
FIG. 13 schematically shows the fixing base according to another example of the present application.

FIG. 13 schematically shows a first main body part 1 according to another example of the present disclosure. As shown in FIG. 13, in order to connect the first main body part 1 and the basal body such as the ceiling, a mounting support seat 2007 is provided. A contact surface between the first main body part 1 and the basal body is referred to as a top end surface, and the top end surface may be a virtual plane and is right opposite to the bottom end surface 100A of the first main body part 1. As shown in FIG. 13, the mounting support seat 2007 in the present example is located at the upper end edge or the outer side of the top end surface of the first main body part 1. The mounting support seat 2007 is formed by extending outward from the upper end edge of the outer surface of the first main body part 1. The upper surface of the mounting support seat 2007 is flush with the top end surface of the first main body part 1. There are multiple mounting support seats 2007, which may be connected with the basal body through connectors, such as screws, or may be integrated with the first main body part 1. After the lamp is mounted, the mounting support seat 2007 actually bears the weight of the whole lamp. Therefore, in the present example, a first reinforcing plate 3061 is arranged in the mounting support seat 2007 to serve as a first reinforcing structure. The first reinforcing plate 3061 is a flaky metal sheet substantially in an L shape and may be formed by stamping or formed by bending a metal sheet. The mounting support seat 2007 is provided with a mounting position capable of accommodating the first reinforcing plate 3061. When the first main body part 1 is connected with the basal body, the screws pass through the mounting support seat 2007 and the first reinforcing plate 3061 in sequence to be fixed to the basal body, so that the reinforcing plate 3061 in the mounting support seat 2007 may play a reinforcing role and prevent the breaking of the mounting support seat 2007, thereby improving the safety. The mounting support seat 2007 is provided with a receiving space recessed along the upper surface of the mounting support seat, and the first reinforcing plate 3061 is received therein. The mounting support seat and the first reinforcing plate may be assembled or may be integrated in a covering way.

In the present example, the first joint part is a bump 2003 extending outward from the lower end edge of the outer surface of the first main body part 1. In an assembled state, the first joint part may suffer a large external force. A second reinforcing plate 3062 is arranged at the first joint part to serve as a second reinforcing structure. The second reinforcing plate 3062 is also a metal plate. In the present example, the second reinforcing plate 3062 is arranged above the first joint part and attached to the first joint part, but in other preferred examples, the second reinforcing plate 3062 may also be inserted into the first joint part, or may be integrated with the first joint part in a covering way.

Figure 14:
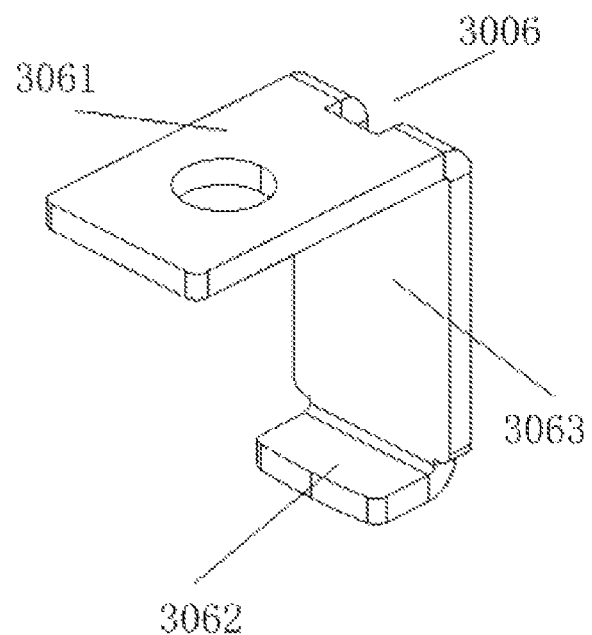
FIG. 14 schematically shows a schematically structural diagram of a reinforcing structure in FIG. 13.
Figure 15:
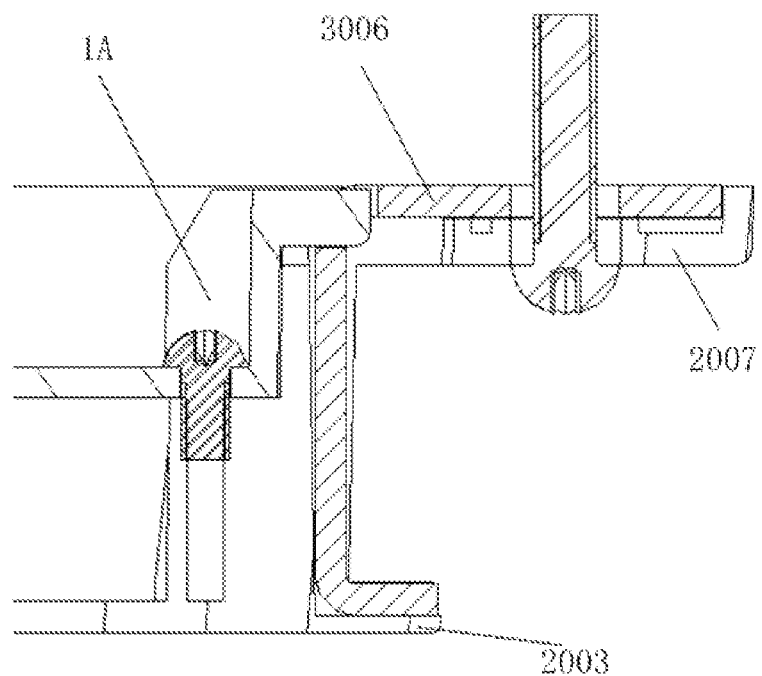
FIG. 15 schematically shows a partial section view of FIG. 13.

As mentioned above, although the mounting support seat 2007 and the first joint part become more reliable due to the reinforcing structure, the force generated by hanging the lamp on the first main body part 1 can be transferred to the basal body only through the first main body part 1. Therefore, a connection plate 3063 is arranged between the first reinforcing plate 3061 and the second reinforcing plate 3062, and two end parts of the connection plate 3063 are connected with the first reinforcing plate 3061 and the second reinforcing plate 3062, respectively, so as to form a single reinforcing member 3006. The schematically structural diagram of the reinforcing member is as shown in FIG. 14. In the present example, because both of the first reinforcing plate 3061 and the second reinforcing plate 3062 are metal plates, the reinforcing member 3006 may be formed by bending a whole metal sheet, and in other examples, the reinforcing member 3006 may also be made of other high-strength materials. FIG. 15 is a section view of the reinforcing member 3006 mounted in the first main body part 1. In order to mount the reinforcing member 3006, the amount of the first joint parts shall be the same as that of the mounting support seats 2007. The first joint part shall be arranged right opposite to the mounting support seat 2007 in the axial direction. For the connection plate 3063, a through groove needs to be provided at the first main body part 1 to receive the connection plate 3063, and the connection plate 3063 passes through the through groove, so that the exterior of the mounting base is smooth. In other preferred examples, the connection plate 3063 may be attached to the outer surface of the first main body part 1 and may be connected with the first main body part 1 by connectors, such as screws, buckles, etc.

Figure 16:
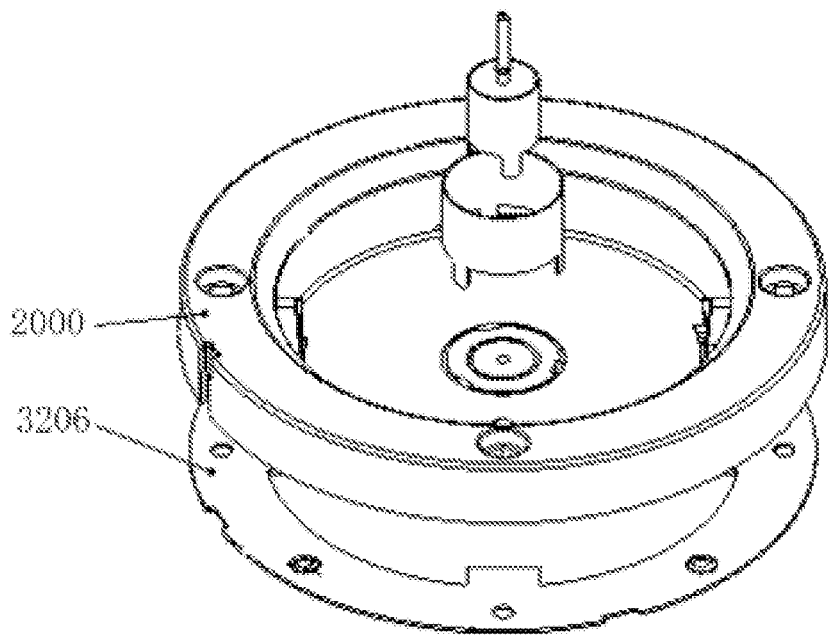
FIG. 16 schematically shows a structure of a connection base matched with FIG. 13.

After the reinforcing member 3006 is added to the first main body part 1, a reinforcing structure is also additionally arranged in the connection base 2000. Specifically, as shown in FIG. 16, a reinforcing support 3206 is arranged in the second main body part 2A of the connection base 2000, and during the mounting, the screws pass through the second main body part 2A and the reinforcing support 3206 of the connection base simultaneously. The reinforcing support 3206 may be arranged on the connection base 2000 or may be integrated with the connection base 2000 in a covering way.

In addition, when the lamp mounting device of the present application is used to mount the lamp, because the first main body part 1 and the connection base 2000 are connected by rotation, which is unfavorable for the square lamp, and may make an outer frame of the lamp unable to keep level to the building wall, affecting the overall effect. Therefore, a positioning structure is arranged on the first main body part 1. The positioning structure includes four positioning members extending outward from the first main body part 1. The positioning members are distributed uniformly on a circumference adopting the rotation shaft of the connection base 2000 as the center. In the present example, the four mounting support seats 2007 are configured as the positioning members, and an included angle between two adjacent mounting support seats 2007 is 90 degrees. In other examples, the amount of the mounting support seats 2007 may not be four.

However, in order to realize the positioning, at least four mounting support seats 2007 shall be provided. When more than four mounting support seats 2007 are provided, four of the mounting support seats may be selected as the positioning members. The mounting support seats 2007 used as the positioning structure may be distinguished from other mounting support seats 2007 in appearance (shape or color).

Specific steps for mounting the lamp in the present example are described below. In the present example, the lamp mounting device is used to mount a square lamp.

The four mounting support seats 2007 arranged on the first main body part 1 are fixed to the ceiling through the screws. A wall is selected as a reference wall, and a connection line between a pair of mounting support seats 2007 arranged opposite to each other is kept perpendicular or parallel to the reference wall. An external power supply wire is connected with the first electric connection part.

The connection base 2000 is pre-arranged on the lamp. The connection base 2000 is mounted in the first main body part 1; the connection base 2000 is rotated clockwise; and the second joint part on the connection base 2000, i.e., a mounting groove 2005, rotates with the connection base to the first joint part, i.e. the bump 2003, and is hung on the bump 2003. The connection base is kept in a lifting state to decline slowly, and after the effective action of the mounting groove 2005 is confirmed, the mounting groove 2005 of the connection base 2000 is firmly assembled with the bump 2003 of the first main body part 1 without loosening, thus completing the mounting process.

The mounting support seat 2007 of the first main body part 1 serves as the positioning structure; the connection line between a pair of mounting support seats 2007 that are arranged opposite to each other is kept perpendicular to the reference wall and/or kept parallel to the reference building wall; and an included angle between two adjacent mounting support seats 2007 is 90 degrees. Since the amount of the first joint parts is the same as that of the mounting support seats 2007, such as four first joint parts in total, four connection directions between the connection base 2000 and the first main body part 1 are also arranged; however, no matter in which of the four directions the connection base 2000 is assembled with the first main body part 1, the side wall of the square lamp can be kept parallel to the reference building wall.

In an example, as shown in FIG. 1, a kidney-shaped hole 111 is provided on each mounting support seat 2007. When the lamp is mounted, the first main body part 1 is fixed onto the ceiling through the mounting support seat 2007 and the kidney-shaped hole 111. Preferably, the four kidney-shaped holes 111 are different in orientations, for example, the kidney-shaped holes 111 on two adjacent mounting support seats 2007 are orientated in the radial direction, while the kidney-shaped holes 111 on the other two adjacent mounting support seats 2007 are orientated in the circumferential direction. Thus, when the first main body part 1 is fixed onto the ceiling, the two kidney-shaped holes 111 orientated in the radial direction may be installed in place first, and in this case, the first main body part 1 still has some adjustment allowance; and after the first main body part 1 is adjusted in place completely, the kidney-shaped holes 111 orientated in the circumferential direction are installed in place. In this way, in the lamp mounting process, the user may perform fine adjustment on the position of the lamp, thereby facilitating the mounting of the lamp. Of course, the kidney-shaped holes 111 orientated in the circumferential direction may be installed in place first, and then the kidney-shaped holes 111 orientated in the radial direction are installed in place, which has the same effect and is not repeated here.

The present application also relates to a lamp 1700. The lamp 1700 has the first main body part 1 as mentioned above and the lamp mounting device 2000 as mentioned above. Furthermore, the lamp 1700 also has a lamp body 1701 that is mounted on the connection base 2002 and electrically connected with the second electrical connection part 2111.

In summary, the fixing base, the lamp fixing device and the lamp provided in the examples of the present application can make the wire connecting operation get rid of the space limitation of the accommodation cavity, thereby solving the problem that the wire connection is difficult.

The above description is only examples of the present application and is not used to limit the present application. For those skilled in the art, various changes and variations of the present application can be made. Any modifications, equivalent substitution, and improvements made within the spirit and principle of the present application shall be contained within the scope of claims of the present application.

What is claimed is:

1. A fixing base, comprising:
   a first main body part and a junction box;
   wherein the first main body part comprises an accommodation cavity for accommodating the junction box, a first joint part and a first detachable connection part connected with the junction box directly and detachably; and
   wherein the junction box is provided with a first electrical connection part and a second detachable connection part cooperated with the first detachable connection part detachably, the first detachable connection part and the second detachable connection part are configured to be detachably connected through relative rotation along a rotation shaft, and the junction box is configured to be fixed detachably in the accommodation cavity through cooperation of the first detachable connection part and the second detachable connection part.

2. The fixing base according to claim 1, wherein the first main body part has a bottom end plate, and the rotation shaft is perpendicular to the bottom end plate.

3. The fixing base according to claim 2, wherein a surface of the bottom end plate that is to form the accommodation cavity is a bottom end surface, the first detachable connection part includes at least one claw distributed along a circumferential direction of the rotation shaft, and a buckling gap is formed between the claw and the bottom end surface;
   the second detachable connection part includes an extension part arranged along the circumferential direction, and notch(s) of the same amount as the at least one claw is/are provided on the extension part; and
   the extension part can enter the buckling gap through the notch, and the notch and the claw can be staggered to each other through the relative rotation along the rotation shaft to realize the detachable connection.

4. The fixing base according to claim 3, wherein the junction box is also provided with an abutting surface abutting the bottom end surface, the extension part includes an oblique leading area adjacent to the notch and a fastening area smoothly connected with the oblique leading area, when the oblique leading area is located in the buckling gap, the abutting surface abuts the bottom end surface, and a side of the fastening area facing away from the bottom end surface is flush with a side of the claw facing the bottom end surface or further away from the bottom end surface.

5. The fixing base according to claim 4, wherein the abutting surface is a surface of the extension part facing the bottom end surface.

6. The fixing base according to claim 4, wherein at least two claws are provided, a baffle plate is arranged between adjacent claws, and the extension part abuts the baffle plate.

7. The fixing base according to claim 2, wherein the first detachable connection part is a first thread arranged around the rotation shaft, and the second detachable connection part is a second thread that can be threadedly fit with the first thread.

8. The fixing base according to claim 2, wherein a mounting through hole is provided on the bottom end plate, and when the junction box is fixed detachably in the accommodation cavity through the cooperation of the first detachable connection part and the second detachable connection part, the first electrical connection part is exposed to the outside through the mounting through hole.

9. The fixing base according to claim 8, wherein the mounting through hole is arranged coaxially with the rotation shaft.

10. The fixing base according to claim 1, wherein the first electrical connection part is a gyration structure with a gyration shaft as a gyration center.

11. The fixing base according to claim 10, wherein the first electrical connection part is provided with at least two electric connection ends, and the electric connection ends are arranged coaxially from inside to outside along the gyration shaft; and
    each electric connection end is a receiving groove, and two adjacent receiving grooves are insulated from each other.

12. The fixing base according to claim 10, wherein the gyration shaft is coaxial with the rotation shaft.

13. A lamp fixing device, comprising a connection base connected with a lamp body and the fixing base according to claim 1;
    wherein the connection base has a second joint part and a second electrical connection part, the connection base and the first main body part can be mechanically fixed through the cooperation between the first joint part and the second joint part, and at the same time, the first electrical connection part is cooperated with the second electrical connection part, so that the connection base and the junction box are electrically connected through the cooperation between the first electrical connection part and the second electrical connection part.

14. The lamp fixing device according to claim 13, wherein, in a case that the first electrical connection part is a gyration structure with a gyration shaft as a gyration center, the second electrical connection part is also a gyration structure.

15. The lamp fixing device according to claim 14, wherein the first electrical connection part includes at least two receiving grooves that are arranged coaxially from inside to outside along the gyration shaft, and two adjacent receiving grooves are insulated;
    the second electrical connection part includes conductive terminals with the same amount as that of the receiving grooves from inside to outside along the gyration shaft, and the conductive terminals correspond to the receiving grooves one by one; and
    when the first electrical connection part and the second electrical connection part are cooperated with each other, the pair of conductive terminals stretch into the corresponding receiving grooves to realize the electric connection.

16. The lamp fixing device according to claim 13, wherein the connection base further comprises a second main body part, and the second joint part and the second electrical connection part both are arranged on the second main body part.

17. The lamp fixing device according to claim 13, wherein the second joint part and the second electrical connection part are arranged separately on the lamp body.

18. The lamp fixing device according to claim 13, further comprising an elastic element, wherein, when the connection base and the first main body part are mechanically fixed, the elastic element can apply an acting force simultaneously to the first main body part and the connection base and prevent the relative movement between the first main body part and the connection base together with the first joint part and the second joint part.

19. A lamp, comprising a lamp body and the lamp fixing device according to claim 13, wherein the lamp body is fixedly connected with the connection base.

20. The lamp according to claim 19, wherein the lamp body and the connection base are of a detachable connection structure or an integrated connection structure.

* * * * *